United States Patent
Bruce et al.

(10) Patent No.: US 9,147,279 B1
(45) Date of Patent: Sep. 29, 2015

(54) SYSTEMS AND METHODS FOR MERGING TEXTURES

(71) Applicants: James R. Bruce, Sunnyvale, CA (US); Christian Frueh, Mountain View, CA (US); Arshan Poursohi, Berkeley, CA (US)

(72) Inventors: James R. Bruce, Sunnyvale, CA (US); Christian Frueh, Mountain View, CA (US); Arshan Poursohi, Berkeley, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/839,508

(22) Filed: Mar. 15, 2013

(51) Int. Cl.
*G06T 15/04* (2011.01)

(52) U.S. Cl.
CPC ..................................... *G06T 15/04* (2013.01)

(58) Field of Classification Search
None
See application file for complete search history.

(56) References Cited

U.S. PATENT DOCUMENTS

2006/0284880 A1* 12/2006 Zhou et al. ..................... 345/582
2012/0176478 A1   7/2012 Wang et al.
2012/0177283 A1   7/2012 Wang et al.

OTHER PUBLICATIONS

Andrade et al., "Digital preservation of Brazilian indigenous artworks: Generating high quality textures for 3D models." Journal of Cultural Heritage 13, No. 1 (2012): 28-39. Available online Jun. 23, 2011.*

Autodesk 123D Catch. www.123dapp.com/catch. 2013.
Brown, Benedict J. and Rusinkiewicz, Szymon, Non-Rigid Range-Scan Alignment Using Thin-Plate Splines, Symposium on 3D Data Processing, Visualization, and Transmission, Sep. 2004.
Shi, Jianbo and Tomasi, Carlo, Good Features to Track, IEEE Conference on Computer Vision and Pattern Recognition, Seattle, WA, Jun. 1994.
Levoy, Marc et al., The Digital Michelangelo Project: 3D Scanning of Large Statues, SIGGRAPH '00, Proceedings of the 27th Annual Conference on Computer Graphics and Interactive Techniques, pp. 131-144, Jul. 2000.
Brown, Benedict J. and Rusinkiewicz, Szymon, Global Non-Rigid Alignment of 3-D Scans, ACM Transactions on Graphics (Proc. SIGGRAPH), Aug. 2007.
Vlasic, Daniel et al., Dynamic Shape Capture Using Multi-View Photometric Stereo, ACM Trans. Graphics (Proc. SIGGRAPH Asia) 28(5), Dec. 2009.

* cited by examiner

*Primary Examiner* — Joni Richer
*Assistant Examiner* — Yi Wang
(74) *Attorney, Agent, or Firm* — McDonnell Boehnen Hulbert & Berghoff LLP

(57) ABSTRACT

Examples disclose a method and system for merging textures. The method may be executable to receive one or more images of an object, identify a texture value for a point in a first image of the one or more images, and determine a metric indicative of a relation between a view reference point vector and a normal vector of a position of a point on the object relative to the image capturing device. Based on the metrics, the method may be executable to determine a weighted average texture value to apply to a corresponding point of a three-dimensional mesh of the object.

17 Claims, 6 Drawing Sheets

SYSTEMS AND METHODS FOR MERGING TEXTURES

BACKGROUND

In computer graphics, three-dimensional modeling (3D) involves generation of a representation of a 3D surface of an object. The representation may be referred to as a 3D model or 3D object model, and can be rendered or displayed as a two-dimensional (2D) image via 3D rendering or displayed as a 3D image, such as a stereoscopic 3D image. 3D models represent a 3D object using a collection of points in 3D space, connected by various geometric entities such as triangles, lines, curved surfaces, etc. Various techniques exist for generating 3D models utilizing point clouds and geometric shapes, for examples.

Being a collection of data, 3D models can be created by hand, algorithmically, or objects can be scanned, for example. The process of scanning 3D models may include obtaining data from one or more scanners having one or more scan heads, where the scan heads may include geometry cameras, projectors, texture cameras, etc. As an example, an artist may manually generate a stereoscopic 3D image of an object that can be used as the 3D model. As another example, an object may be scanned and the scanned image can be used to generate the stereoscopic 3D image of the object. As still another example, an image of an object may be used to generate a point cloud that can be algorithmically processed to generate the stereoscopic 3D image. A point cloud may include, for example, vertices in a 3D dimensional coordinate system.

3D models may include solid models that define a volume of the object, or may include shell or boundary models that represent a surface (e.g., the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

A 3D model may be created by obtaining one or more scans or images of a 3D object, aligning the scans, and merging the scans together to create a 3D mesh of the 3D model. This alignment and merging process often results in the loss of color and/or other texture information. One way to address this issue is to obtain color and/or other texture information from the scans or images of the 3D object, determine an average color and/or texture for a location on the 3D object, and apply the average color and/or texture to a corresponding location on a 2D or 3D mesh. This approach, however, may result in the average color and/or texture being applied to the wrong location on the 2D or 3D mesh, and may result in ghost images, fuzzy edges, and/or an otherwise unclear 3D model.

Another way to address this issue is to warp colors and/or textures associated with one or more of the scans or images so that the colors and/or textures come into better alignment and produce a more clear 3D model. This warping process may include determining a confidence interval associated with a location of the color and/or texture information. The confidence interval may be indicative of how confident a computing device is that the identified texture value is an accurate representation of the texture at the location of the object. The confidence interval may be determined in a variety of ways. For example, the confidence interval may be determined using a dot product or scalar product of two normalized vectors (e.g., an eye vector and a unit-length normal vector) and raising the value of the dot product to a power. The resulting confidence interval may be used to weight color and/or texture information associated with a location on the 3D object. One or more weighted colors and/or textures associated with a location on the 3D object may be averaged to determine what color and/or texture should be assigned to the specific location. By weighting texture values in this manner, the viewpoint of the scanner, angle of the scanner, and other factors associated with the scanned data may be used to influence how much weight should be associated with a color value and/or texture. This process may allow for an increased accuracy of the texture at each location and reduce the likelihood of ghost images, fuzzy edges, and/or an otherwise unclear 3D model.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, many types of devices may be used or configured to perform logical functions in any of the processes or methods described herein.

In yet further examples, many types of devices may be used or configured as means for performing functions of any of the methods described herein (or any portions of the methods described herein).

For example, a method may be executable to receive, at a computing device, one or more images of an object, and identify a texture value for a point in a first image of the one or more images of the object. The method may be further executable to identify a view reference point vector between the point in the first image and an image capturing device, to identify a normal vector of the point in the first image, and to determine a metric indicative of a relation between the view reference point vector and the normal vector. Based on the metric, the method may be executable to use the identified texture value to determine a weighted average texture value for the point in the first image to apply to a corresponding point of a three-dimensional (3D) mesh of the object.

Also disclosed herein are structures configured to facilitate implementation of the disclosed methods. One embodiment may take the form of a (a) means for receiving one or more images of an object; (b) means for identifying a texture value for a point in a first image of the one or more images of an object; (c) identifying a view reference point vector between the point in the first image and an image capturing device; (d)

identifying a normal vector of the point in the first image; (e) determining a metric indicative of a relation between the view reference point vector and the normal vector; and (f) means for using the identified texture value to determine a weighted average texture value for the point in the first image to apply to a corresponding point of a three-dimensional (3D) mesh of the object.

Another embodiment may take the form of a system that may include at least one processor, a non-transitory computer-readable medium, and program instructions stored on the non-transitory computer-readable medium and executable by the at least one processor to cause the system to carry out the functions described herein. Another example may include a non-transitory computer-readable medium and program instructions stored on the non-transitory computer-readable medium and executable by at least one processor to carry out the functions described herein.

These as well as other aspects, embodiments, and features will become apparent to those of ordinary skill in the art by reading the following detailed description, with reference where appropriate to the accompanying drawings.

DETAILED DESCRIPTION

In some examples, methods and systems described herein include processes for merge textures. In particular, the systems and methods describe a collection of multiple images associated with a 3D object, and some or all of these images may be aligned and combined to create a high resolution 3D mesh that may be used to represent the 3D object. In some examples, combining the images associated with the 3D object to create the 3D mesh may cause color and/or texture information associated with the 3D model to be lost. Methods and systems herein describe examples for determining color information to associate with the 3D data model object.

A texture can broadly include any number of colors, surface textures, or other details. The process of translating textures may include creating a high resolution 3D mesh from the images of the 3D object, downsampling the 3D mesh model, unwrapping the 3D mesh model, identifying texture information of the 3D object (e.g., via ray casting or an alternative procedure), and applying the identified texture to the high resolution 3D mesh, a low resolution 3D mesh, an unwrapped 3D mesh, etc.

As an example, one or more images of a 3D object may be used to create a high resolution 3D mesh. However, not all of the data associated with the high resolution 3D mesh may need to be stored and/or displayed. In such embodiments, a low resolution 3D mesh of the 3D object may be created by decreasing the number of vertices, edges, and/or faces used to define the high resolution 3D mesh. The low resolution 3D mesh may be unwrapped to create a two-dimensional (2D) mesh. A server, or other system implementing the methods described herein, may identify a texture, such as a color, associated with all or part of the 3D mesh (or optionally the 2D mesh). One process for identifying a color may include identifying a location on an image of the 3D object and identifying a color value (or other texture) associated with the location on the image. The server may associate a confidence interval with the color value to indicate how confident the server can be that the identified color value is an accurate representation of the color value at the location. In some examples, the confidence interval may be determined by applying an exponent to the dot product or of two normalized vectors; however, other examples are also possible. The resulting confidence interval may be used to weight the color value at the location such that a color value having a high confidence interval is given more weight than a color value having a low confidence interval. When multiple color values are associated with a location, the server may weight each color value and determine an average weighted color value associated with the location.

Figure 1:
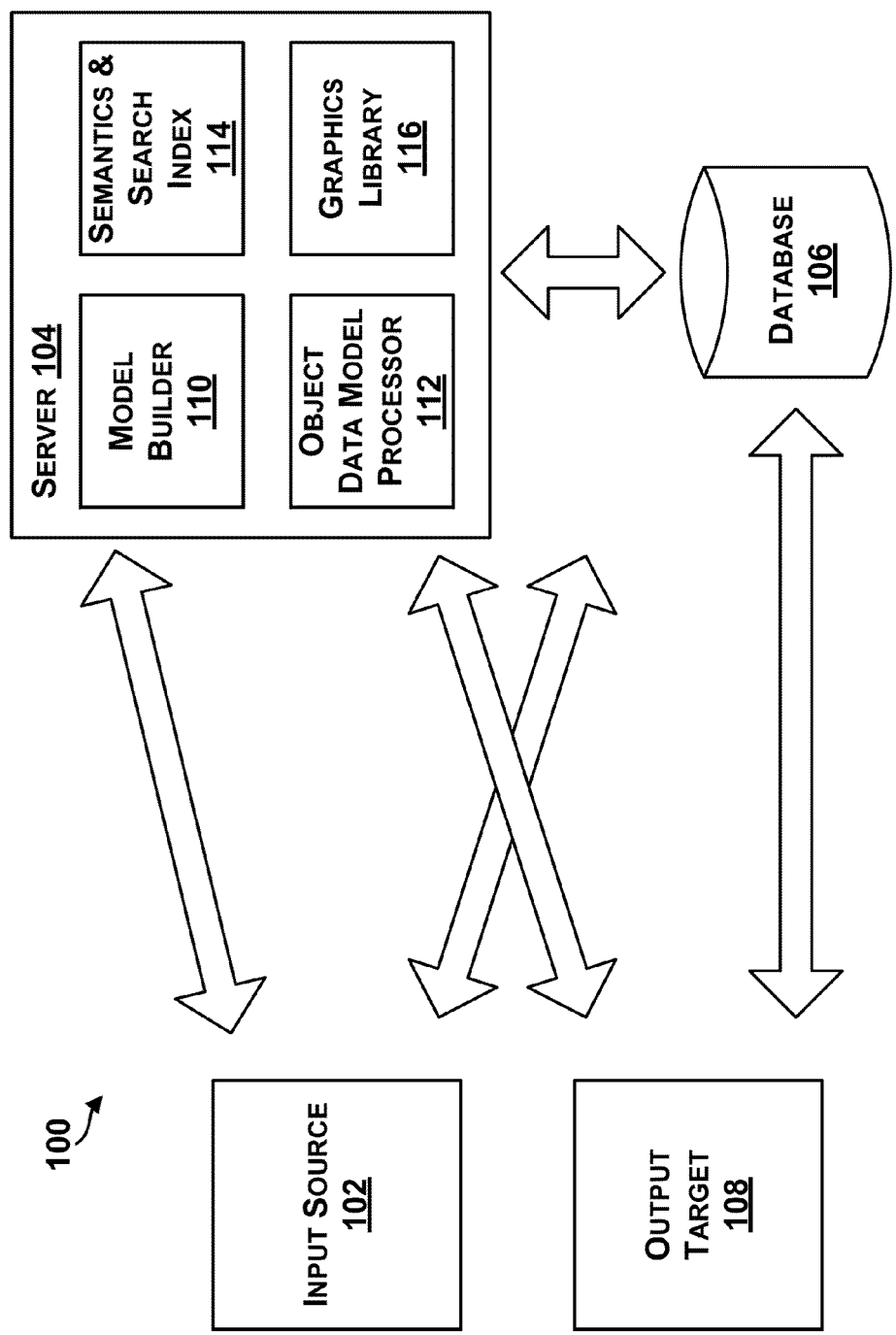
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. One or more of the described functions of the system 100 may be divided into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D model (and/or one or more images or scans of a 3D object) may be received. In some examples, the shape and appearance of the 3D model may be acquired by working with venders or manufacturers to scan objects in 3D. The process of scanning the objects in 3D may include obtaining data from one or more scanners. Each scanner may have one or more heads, which may include geometry cameras, projectors, texture cameras, etc. In embodiments, the projector and geometry cameras may be used to capture a 3D mesh of a particular view, while the texture camera may be used to capture a color photo from a nearby position.

For instance, structured light scanners may capture images of an object and a shape of the object may be recovered using monochrome stereo cameras and a pattern projector. In other examples, a high-resolution digital single-lens reflex (DSLR) camera may be used to capture images for color texture information. In still other examples, a raw computer-aided drafting (CAD) set of drawings may be received for each object. The input source 102 may provide a 3D model (and/or one or more images or scans of the 3D object), in various forms, to the server 104. As one example, multiple scans of an object may be processed into a merged mesh and assets data model, and provided to the server 104 in that form. In another example, multiple scans of an object may be sent to the server 104, where the server may process the multiple scans into a merged mesh, may use the multiple scans to further describe an existing merged mesh, etc. In yet another example, one or more scans of the 3D model may be aligned with one or more CAD models using a standard mesh alignment or other alignment process.

The server 104 may include a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 may receive the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry. As described herein, unwrapping may include mesh parameterization.

The object data model processor 112 may also receive the mesh data set for each object from the input source 102 and generate display meshes. For instance, the scanned mesh images may be decimated (e.g., from 1 million to 60,000 surfaces) utilizing texture-preserving decimation. Texture map generation can also be performed to determine color texture for map rendering. Texture map generation may include using the mesh data sets that have colors but no UV unwrapping to generate a mesh with UV unwrapping but no colors.

The process of decimating the scanned mesh images may be performed before or after a texture-generating procedure. For example, the server 104 may: (i) merge a model with or without maintaining color data associated with the model, (ii) decimate the merged model with or without preserving texture data associated with the merged model, (iii) unwrap the merged model and apply one or more of the texturing systems described herein, and (iv) decimate the model while preserving texture data. In some implementations of this example, the server 104 may avoid decimating the model with or without preserving texture data (e.g., steps (ii) and/or (iv)). In another example, the server may: (i) merge a model with or without maintaining color data associated with the model, (ii) decimate the model with or without preserving texture to one or more models (e.g., models 0 . . . k), and (iii) for each of the k models, unwrap and apply the texturing systems described herein. Other examples are also possible.

The semantics and search index 114 may receive captured images or processed images that may have been decimated and/or compressed, and may perform texture resampling and also shape-based indexing on the processed images. For example, for each object, the semantics and search index 114 may index or label components of the images (e.g., per pixel) as having a certain texture, color, shape, geometry, attribute, etc.

The graphics library 116 may include an OpenCTM mesh compression library (and mesh format) to reduce a mesh file size, for example. The graphics library 116 may include one or more custom compression techniques that may be tailored for fast decoding for one or more application programming interfaces, such as OpenGL and/or WebGL. The graphics library 116 may provide the 3D model in a form for display on a browser, for example. In some examples, a 3D model viewer may be used to display images of the 3D objects data model. The 3D model viewer may be implemented using WebGL within a web browser, or OpenGL, for example.

The database 106 may store one or more data sets for a 3D model in any number of various forms from raw data captured to processed data for display.

The output target 108 may include a number of different targets, such as a webpage on the Internet, a search engine, a database, etc. The output target 108 may include a 3D model viewer that enables product advertisements or product searches based on the 3D model.

In examples herein, the system 100 may be used to acquire data of an object, process the data to generate a 3D model, and render the 3D model for display.

In some examples, annotations may be provided for aspects of the 3D model. For instance, an annotation may be provided to label or index aspects of color, texture, shape, appearance, description, function, etc., of an aspect of a 3D model. Annotations may be used to label any aspect of an image or 3D model, or to provide any type of information. Annotations may be performed manually or automatically. In examples herein, an annotated template of an object in a given classification or category may be generated that includes annotations, and the template may be applied to all objects in the given classification or category to apply the annotations to all objects. In examples, annotations to label or index aspects of color, text, shape, appearance, description, function, etc. for any given aspect may vary. The variations may be based on the collected images, the degree at which one or more meshes were decimated, one or more lighting changes, changes in the texture cameras capture of the data, etc., in accordance with at some of the embodiments described herein.

Figure 2:
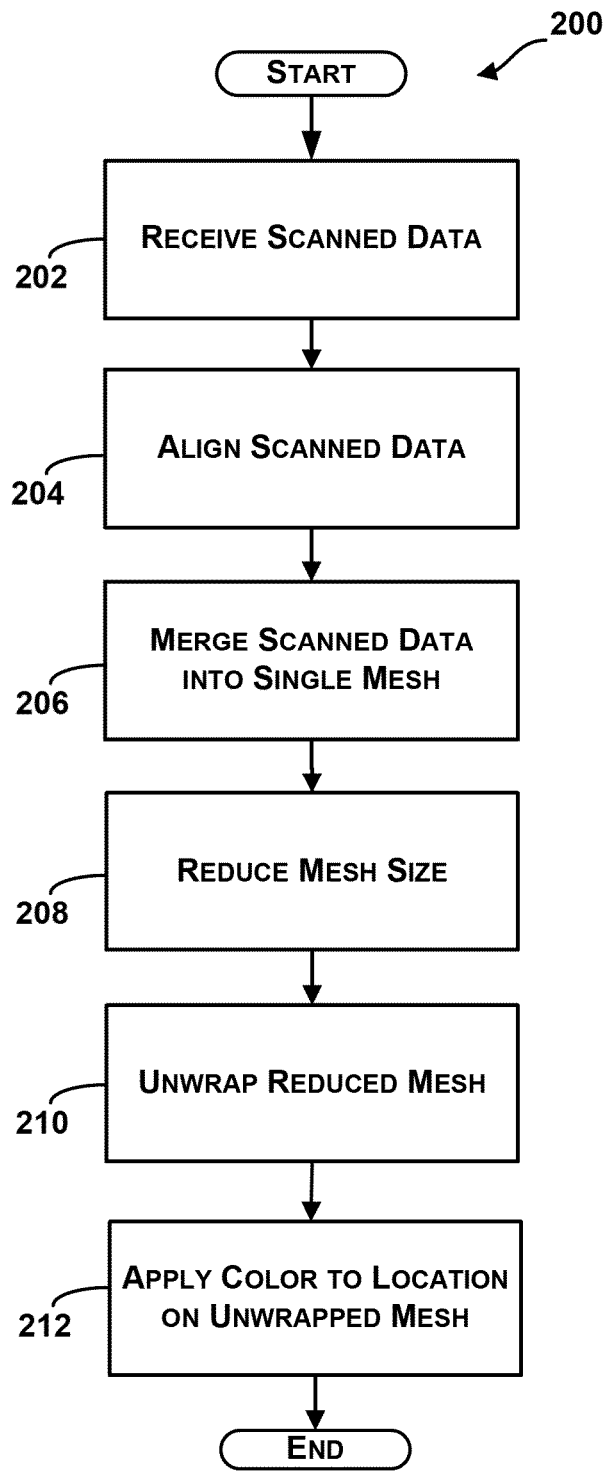
FIG. 2 illustrates a block diagram of an example method for creating a mesh from one or more images.

FIG. 2 illustrates a block diagram of an example method 200 for creating a mesh from one or more images, in accordance with embodiments described herein. Method 200 may be used with the system 100, and may be performed by a device or components of the device. An example device may include the server illustrated in FIG. 1 or any number of other devices associated with the system. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage system. The computer readable medium may, for example, be considered a computer readable storage medium or a tangible storage device.

In addition, for the method 200 and other processes and methods disclosed herein, each block in FIG. 2 may represent circuitry that may be wired to perform the specific logical functions in the process.

At block 202, the method 200 includes receive scanned data. The scanned data may be received by a device, such as a server, and may be representative of any number of objects. In embodiments, the scanned data may be obtained via one or more scanners having one or more heads. The one or more heads may include geometry cameras, projectors, texture cameras, etc. One or more of the scan heads may be positioned around the object so as to obtain data from a variety of directions. Thus, for example, an object may be placed on a transparent moving turntable, and scan heads may be positioned above, below, and in front of the object. The scan heads may obtain information about the object as the object rotates using the turntable. Each instance at which data is obtained may be associated with a view, and each view may be associated with an image, a geometric mesh, and/or a textured mesh, for example. Other examples are possible as well.

At block 204, the method 200 may include align scanned data. The scanned data may be aligned by the server. As an example, the scanning process may involve scanning an object from multiple different views using a plurality of devices on one or more of the scan heads. This process may result in a plurality of images from different angles, with different lighting, from different distances, etc. The plurality of images may be processed and aligned using any number of algorithms, such as an iterative closes point (ICP) algorithm. In embodiments, the geometry from the different images may be brought into close agreement by initializing the images based on the known scan head positions, the turntable angle, etc. In some examples, scanned data may be aligned by an alignment server and received at another server for further processing.

At block 206, the method 200 may include merge scanned data into single mesh. This process may be performed by a server, for example, and may include the server merging or otherwise combining one or more of the aligned images together. In embodiments, the process of merging the scanned data into a single mesh may be performed in whole or in part by the model builder 110, for example, and may include identifying the same or similar location on one or more of the images of the 3D object, identifying an average or representative location corresponding to the location on the one or more images of the 3D object, and creating an exemplary merged model based on the representative locations. The result of the merger may be a mesh that may include a collection of finite elements that may be used to model or otherwise define the shape of the scanned object. In some examples, the elements that may be used to create the mesh may include a collection of vertices, edges, faces, etc.

In embodiments, the vertices, edges, faces, etc. included in the mesh may be used to create a plurality of triangles or other geometric shapes. The number and types of geometric shapes that may be used during the merge may vary based on the amount of detail associated with one or more of the views, the size of the object, the number of scan heads, the type of scanner and/or camera used to obtain the scan data, etc. For example, a first object may be represented with millions of triangles, while a second object may be represented with hundreds of thousands of quadrilaterals or other convex and/or concave polygons. In some examples, a variety of different types of polygons may be used to define the object such that triangles may be used to define a first portion of the object and quadrilaterals may be used to define a second portion of the object, for example.

During the process of merging the scanned data, color and/or other texture information may be lost. Accordingly, the merging process may result in a single mesh representative of the scanned object; however, the single mesh may be void of color or other texture data.

At block 208, the method 200 may include reduce mesh size. This process may be performed by the server, such as by the object data model processor 112. In embodiments, the process may include the server iteratively merging nearby vertices while trying to maintain the overall shape of the model represented by the mesh. This iterative merging may be performed by identifying nearby vertices, determining whether two or more vertices have the same or substantially similar normal, and if so, merging the two or more vertices into a single vertex. In some embodiments, the merging process may additionally or optionally be performed using any number of known decimation algorithms, such as an iterative edge collapse algorithm using quadric error metrics or other prioritized iterative edge collapse algorithm[s], that allows the number of polygons that make up the mesh to be reduced while preserving the shape of the mesh. By performing this process, a smaller model, with larger polygons, may be created. The smaller model may approximate the higher resolution of the merged model. Thus, for example, the smaller model may include tens of thousands of polygons, which may be representative of the merged higher resolution model having millions of polygons. The amount or degree that an object may be reduced or otherwise decimated may vary between embodiments. It should be understood that as the mesh size is reduced, data associated with one or more points on the mesh may be condensed or lost.

At block 210, the method may include unwrap reduced mesh. This process may be performed by the server. The process of unwrapping the mesh may include associating every point on the 3D mesh to a point on a 2D plane such that f(x,y,z)->(u,v) where (x,y,z) is a surface point on the mesh and (u,v) is a position on the 2D plane. A point on the 3D mesh may be associated with a point on the 2D plane using any number of methods known to those of skill in the art. As an example, a method may be used that converts points on a 3D coordinate system to a 2D coordinate system. Similarly, any number of projection techniques may be used that allow a 3D point to correspond to a 2D point. In embodiments, this process may be performed using one or more projections that may preserve any of the mesh's (i) geometry, (ii) area, (iii) angles, (iv) distances, (v) direction, (vi) etc.

As an example, multiple scan heads may be used to scan an object, such as an orange. The server may receive the scanned data, create a mesh representing the scanned orange, and unwrap the mesh. The unwrapping process may result in the surface of the scanned orange being represented on a 2D plane. However, since the object (the orange) was scanned in 3D space, the conversion of the scanned image data into 2D space by unwrapping and flattening the orange may result in a number of voids that may not be associated with a point on the 3D mesh. This may result in each point on the 3D model corresponding to a point on the 2D plane, but not every point on the 2D plane being associated with a point on the 3D model. As such, the unwrapping process may not be symmetric in that voids on the 2D plane may not have a corresponding point on the 3D model and, therefore, may not be associated with a color corresponding to the scanned data.

At block 212, the method 200 may include apply color to a location on an unwrapped mesh. The process of applying color to a location on the unwrapped mesh may be performed by the server, and may include identifying a color value associated with a location, determining a confidence interval associated with the identified color value, and weighting the identified color value based on the confidence interval. The weighted color value for a location may be averaged with one or more weighted color values associated with a corresponding location in other images. Once a weighted average color value is determined, the weighted average color value may be applied to a corresponding location on the unwrapped mesh, a 3D mesh, a 3D model, etc. Although described in terms of applying color to the location on the unwrapped mesh, it should be understood that the method may also or optionally apply other texture attributes, such as surface reflectivity, shininess, topography, etc., to the location on the unwrapped mesh.

As an example, the server may apply a color value to a location on an unwrapped mesh by, inter alia, associating a weighted average color value for each location on the 2D plane. The color value may be transient or stored in a database. In embodiments, the color value may be updated periodically such as when additional scanned data associated with an object is received. Moreover, in embodiments, the color value may be associated with a location on high resolution the 3D mesh and/or the low resolution 3D mesh. This may be performed directly by applying the color to the 3D mesh without first applying the color to the 2D plan. Optionally, this may be performed by applying the color to the 2D plan and associating the color to the same or similar location on the 3D mesh, for example.

Figure 3:
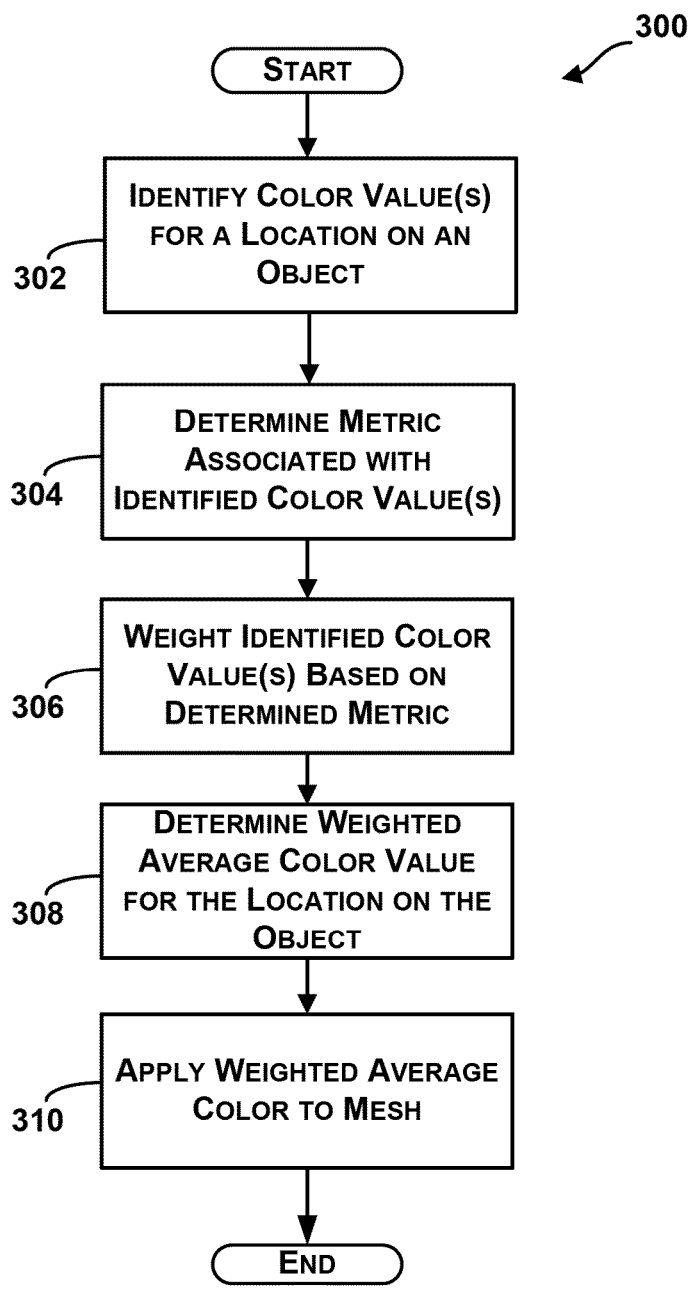
FIG. 3 illustrates a block diagram of an example method for identifying a texture value associated with a location.

FIG. 3 illustrates a block diagram of an example method for identifying a color value associated with a location, in accordance with embodiments described herein. At block 302, the method 300 may include identify color value(s) for a location on an object. Any number of techniques that are known to those of skill in the art may be used to identify the color value. The process of identifying a color value may include, for example, the server receiving one or more images of the object. For each image, the server may select a location, area, point, or portion on the image and identify the color at the selected location. The identified color may be represented as a red, green, blue (RGB) color code or other color format.

For example, the server may receive a plurality of images of an object, such as a shoe. Each image may correspond to a different view of the shoe, and one or more of the views may include the same location(s) on the shoe, such as the sole of the shoe. The server may identify a location on the sole of the shoe in a first image, and identify a color value associated with the location in the first image. The server may determine whether the identified location (or a substantially similar location) is present in one or more other images of the shoe. If the identified location is present in another image (e.g., a second image), the server may determine a color value associated with the identified location in the second image. The server may continue this process for each image having the identified location. Alternatively, the server may perform this process for a representative number of images having the identified location, wherein the representative number of images may be one or more images.

In embodiments, the server may identify different color values for the identified location, wherein a first color value may be associated with an identified location in the first image and a second color value may be associated with the identified location in the second image. Variations in color values for the same or substantially similar identified location may make it difficult for the server to identify an accurate color value for the identified location, and may result in ghost images, fuzzy edges, etc. One way to help address this difficulty is to determine an accuracy of each color value.

At block 304, the method 300 may include determine metric associated with identified color value(s). The server may determine the metric based on a number of factors. For example, the server may determine a metric indicative of how confident the server is that the identified color value is an accurate representation of the color at the location of the object. For instance, the metric may be indicative of a relation between one or more vectors. The relation may take the form of a dot product, cross product, and/or any number of algebraic operations. A confidence may be associated with each identified color value, a group of identified color values, etc. For illustrative purposes, the confidence is described herein in terms of a confidence interval that may correspond to a probability associated with the identified color value (such as a probability that the identified color value is accurate); however, other mechanisms may exist for determining the confidence. In some examples, a probability or general probability distribution function (such as a Gaussian function with a mean and variance) may be associated with one or more identified color values.

A number of factors may influence the metric. Some of these factors may relate to the image of the object and the identified location in the image. For instance, factors such as an eye (or view reference point) vector of a point on the object to the scanner, a normal vector of a point on the object, an angle between the eye vector and the normal vector, a number and/or size of possible obstructions or occlusions, an amount of lightness or darkness at the identified location, a size of the identified location, a distance from the scanner to the identified location, etc. may influence the confidence interval of the identified color. As an example, the confidence interval may be influenced by how much surface area was available during the scan. If a large surface area was available during the scan, it may be assumed that a relatively large amount of data about the object was received, that the data is more accurate, that there is surrounding data that may be available and/or used to identify the color, etc. Conversely, if a small surface area was available, it may be assumed that a correspondingly smaller amount of data, smaller number of surrounding locations, etc. were obtained during the scan. For instance, when scanning a book, a scan of the cover of the book may result in more data than a scan of the rim of the book. The server may associate a color value with both the cover and the rim of the book; however, the server may associate a higher confidence interval with the colors identified on the cover of the book as the scanning device may have had a better view of the cover and was able to obtain relatively more information about the cover.

In some embodiments, the amount of surface area obtained during the scan may be related to the angle of the scan head device to a point on the object during the scan. Thus, for example, a scan of the object may provide relatively more data about the object when taken at an angle orthogonal to the surface of the object (e.g., as determined based on the surface normal at the point) rather than at an acute or an obtuse angle to the surface of the object or at a parallel plane to the surface of the object, for example. In embodiments, the higher the amount of surface area available during the scan, the higher the confidence interval that the color value associated with the scanned surface area is an accurate representation of the color of the object.

The confidence interval of the identified color may be calculated in a number of ways. For example, the confidence interval may be calculated using one or more vectors. The vectors may be an eye (or view reference point) vector and a normal vector. The view reference point may represent a point in world coordinates that defines the origin of a viewing-reference coordinate system. The viewing-reference coordinate system may in turn specify how the world is viewed. In another example, the vectors may be used to determine a distance that the scanner is from the identified location in a particular image. Further, vectors may be used to determine whether the identified location is an edge of the object, a flat surface on the object, etc. Vectors may also be used to determine how good of a view the scanner had of the identified location when the image was obtained.

A server may perform a variety of calculations when determining the confidence interval. Example calculations may include a dot product, a cross product, and/or other algebraic operations. The example calculations may be used to describe or otherwise identify a relation between two or more vectors, such as the eye vector (E) and the normal vector of a point (P) on the object. For instance, the server may calculate a dot product from two vectors (e.g., the eye vector and the normal vector). The eye vector (E) may be representative of a vector from a point (P) on the object to a camera view (C) associated with the image capturing device. The eye vector (E) may be determined, for example, as E=(C−P)/length (C−P). The normal vector (N) may be representative of a normal vector of the point (P) on the object. In examples, the eye vector (E) and/or the normal vector (N) may be normalized. The server may calculate a confidence interval by applying a weight to the dot product. The weight may be a real number. In an example, the weight may be determined by raising the dot product, such as E·N=∥E∥∥N∥ cos θ, to a power. When the eye vector (E) and the normal vector (N) are unit vectors, the weight may similarly be obtained by raising cos θ to a power. The power may be any non-zero power, such as a power greater than 0. Higher powers may allow for more differentiation between variations with the eye vector and the normal vector. The server may use the resulting value to weight the color value for the location.

As an example, when a scanner is pointed directly at a flat portion of the object, there should be a high confidence interval that the color at the identified location is accurate. Using the dot product described above, the eye vector (E) would be directed from a point (P) on the object to the scanner (C), and the normal vector (N) would be a surface normal vector of the point (P) on the object such that the angle θ would be 0 degrees. Using normalized vectors, the dot product would result in a value of one, which raised to a power remains one. A value of one may indicate that there is a high confidence interval that the color at the identified location is accurate.

When a scanner is pointed away from the object, or the identified location is the backside of the object, there should be a low confidence interval (or no confidence interval) that the color at the identified location is accurate. This situation may be illustrated by an inability to identify or otherwise process a surface normal vector. This situation may also be illustrated when the dot product results in a value that is negative. In such situations, the server may determine that the color value is bad data, and give the value no weight or confidence.

When the scanner is pointed directly at the object (e.g., eye vector E), and the identified location is an edge (e.g., normal vector N), there should be a lower confidence interval that the color at the identified location is accurate. This is illustrated, for example, by the angle θ between the eye vector (E) and the normal vector (N) being 90 degrees such that the dot product results in a value of zero. In another illustration, the angle θ may be 60 degrees and (with normalized unit-length eye vector (E) and unit-length normal vector (N)) result in a dot product having a value of 0.5. Raising the value of the dot product to a power may act to exaggerate or better distinguish differences in dot product values, such that a higher confidence interval would be associated with a color value when the scanner has a good view of the identified location than when the scanner does not.

While described in terms of the angle θ between the eye vector (E) and the normal vector (N), it should be understood that a number of additional factors may be used to determine the confidence interval. For example, the confidence interval may be influenced by the distance from the scanner to the object or an identified location on the object. In particular, the server may obtain data associated with a patch of data on the 3D model. The server may determine how big the patch of data on the 3D model looks on a projected image (e.g., how many pixels cover the patch of data). This may be generally referred to as a "projected area" or "apparent area". The server may estimate the projected area (or apparent area) based on the 2D area, which may be approximately equal to the 3D area multiplied by the dot product of the eye vector (E) and the normal vector (N) divided by the distance raised to a power. This may be represented, for example, as (2D area)≈(3D area)*dot(normal, eye)/distance^2. As the projected area shrinks, the 2D area may be simplified to a relative weighting function such as weight_i=dot(normal, eye_i)/distance_i, where i is the i'th camera image.

At block 306, the method 300 may include weight identified color value(s) based on determined metric. A server may perform this process for each image with the identified location, or a subset thereof. In an example, the process may include the server multiplying the determined color value by the metric, such as a confidence interval or other metric. In another example, color values associated with a confidence interval above a predetermined level may be given a first weight, while color values associated with a confidence interval below the predetermined level may be given a second weight, where the first weight is greater than the second weight. Other examples are also possible.

At block 308, the method 300 may include determine weighted average color value for the location on the object. A server may perform this process in a variety of ways. For example, the server may combine one or more of the weighted color values together and determine the mean of the weighted color values. In another example, the server may determine a median of a plurality of weighted color values. For instance, the weighted average color value may be represented as all weighted color values divided by the sum of all of the weights, such that weighted average=(SUM (weight[i]*value[i])/SUM (weight[i])). When there are no images for one or more points, a server (or other computing device) may determine a color bias based on predetermined color values, neighboring color values, etc. For example, when there are no images for one or more points, the server may determine that the weighted average=((SUM (weight[i]*value[i])+BiasColor*BiasWeight)/(SUM (weight[i])+BiasWeight)). In such an example, the BiasColor may be a neutral gray or an average color, and the BiasWeight may be a low weight value (such as a value raised to a negative power). Other examples are also possible.

At block 310, the method 300 may include apply weighted average color value to mesh. A server may apply the weighted average color value to a corresponding location on an unwrapped mesh, a 3D mesh, a 3D model, etc. For instance, when an average color value is identified for a location in a first image and a second image, the average color value may be applied to the same or similar location on the mesh. When differences exist between the location in the first image and the second image, the server may select one of the locations or take an average location to determine what location on the mesh to apply the weighted average color value. This may help to reduce ghost images, fuzzy images, etc. when slightly varying color values associated with the same location are placed next to one another.

Figure 4:
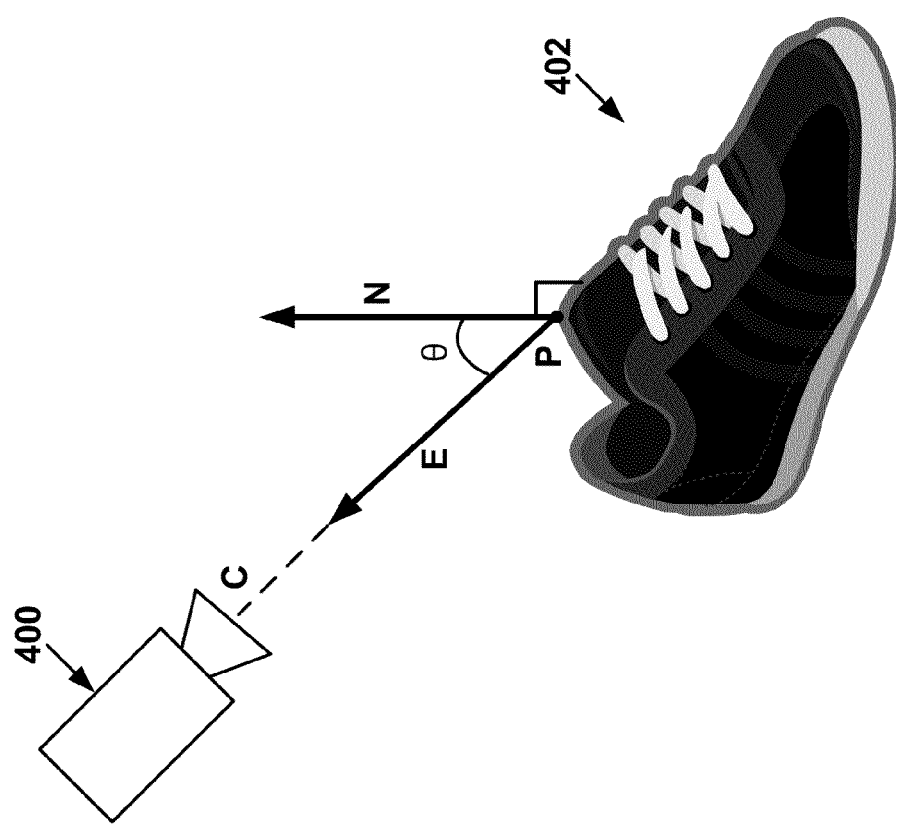
FIG. 4 illustrates example vectors associated with an object.

FIG. 4 illustrates example vectors associated with an object, in accordance with at least some of the embodiments described herein. FIG. 4 includes an image capturing device 400 (which may be the same or similar to input source 102) and an object 402. The image capturing device 400 may include one or more positions, such as camera position "C," which may be used to view one or more points on the object, such as point "P". As shown, vector E may be used to illustrate the eye (or view reference point) vector from the point "P" on the object to the camera position "C". Vector E may be determined as follows: vector E=(C−P)/length (C−P). However, other ways to determine vector E are also possible. While vector E is illustrated from point "P" to camera position "C," is should be understood that other additional eye vectors may exist between one or more other points on the object to one or more other camera positions.

Additional vectors may also be associated with the object 402. For example, a normal vector may be associated with point "P" on the object. The normal vector may be a unit length normal vector, such as vector N. Vector N may be calculated using a cross product, and may represent a vector that is perpendicular to the surface of the object at point "P". Other vectors are also possible.

One or more vectors associated with the object 402 may be used to determine a weight. For instance, a weight may be determined using an angle θ between vector E and vector N, wherein the weight is based on the dot product (i.e., scalar product) of vector E and vector N, taken to a power. When vector E and vector N are normalized, the weight may be based on the cos θ between vector E and vector N being raised to a power. Other examples are also possible.

Figure 5A:
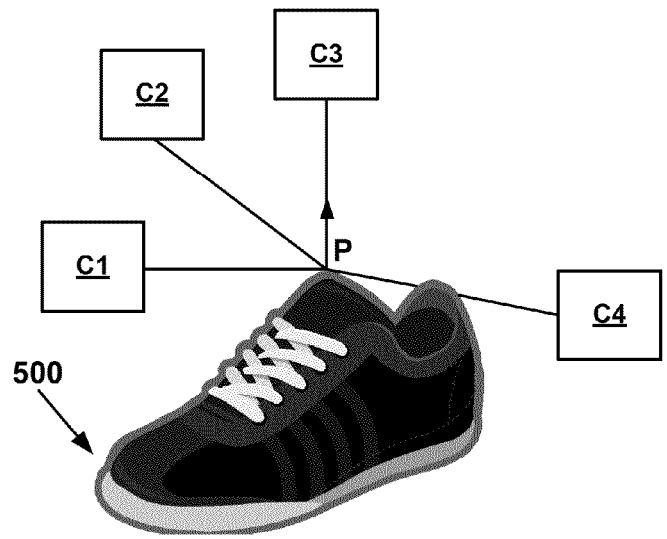
FIGS. 5A-5C illustrate example vectors associated with an object.

FIG. 5A illustrates example vectors associated with an object, in accordance with at least some of the embodiments described herein. As illustrated, FIG. 5A includes an object 500 and a plurality of image capturing devices C1, C2, C3, and C4. Each of the image capturing devices C1, C2, C3, and C4 may include one or more vectors or rays that may intersect part of the object 500. As described in more detail above, a weight may be associated with each of the one or more vectors. The weight may vary, for example, based on how confident a computing device is that a color value is an accurate representation of the color value at the location. For instance, image capturing device C3 may have a good view of a point "P" on the object 500 as represented by a weight of approximately one. In contrast, image capturing device C1 may not have a good view of the point "P" on the object 500 as represented by a weight of approximately zero. Image capturing device C2 may have a comparatively better view of point "P" than image capturing device C1, but a comparatively worse view of point "P" than image capturing device C3. Accordingly, a weight between zero and one may be associated with the view of the point "P" associated with image capturing device C4.

In another example, the vector from the shoe to the image capturing device C4 may intersect the object 500 far from point P, which may indicate that image capturing device C4 does not have a view of the point "P" on the object 500. The computing device may therefore determine that color values for point "P" coming from image capturing device C4 should be assigned a zero weight as there may be little confidence that the image capturing device was able to view the object 500. In some examples, the computing device may inflate the geometry to account for small positional errors to make sure one or more of the vectors are not blocked by the object 500.

While a plurality of image capturing devices C1, C2, C3, and C4 are illustrated, some embodiments may include a greater or fewer number of image capturing devices. For example, the above analysis may apply to a single image capturing device (such as a camera). The object 500 may be repositioned using a turntable, or any number of mechanical or electro-mechanical devices that allow the image capturing device to view the object in one or more ways.

Figure 5B:
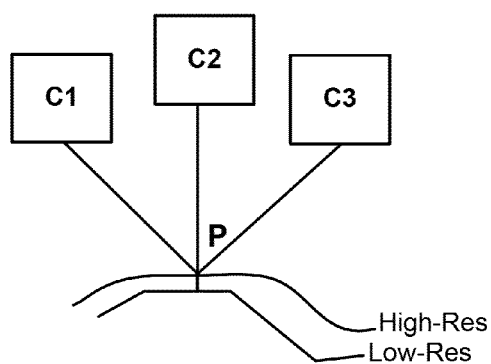
Figure 5C:
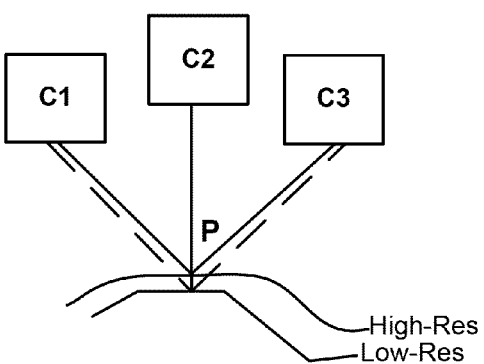

FIGS. 5B and 5C illustrate example vectors associated with an object, in accordance with at least some of the embodiments described herein. As illustrated, FIGS. 5B and 5C include high resolution and low resolution curves on a 3D model. The curves may represent contours or portions of a perimeter of a 3D model. For instance, the high resolution curves may represent portions of a perimeter of the 3D model before the model is decimated. The illustrated low resolution curves may represent corresponding portions of the perimeter of the 3D model after the model is decimated. In another instance, the high resolution curves may be of a 3D model that has been decimated to a lesser extent than the low resolution model. Other instances are also possible.

FIGS. 5B and 5C may also include a plurality of image capturing devices C1, C2, and C3, as well as a high resolution and a low resolution representation of a point "P" on a 3D model. As described herein, the process of identifying a color for a point "P" on the object may include associating a point on a texture triangle with a point on a low resolution model, a high resolution model, and a location on a camera image (e.g., a calibrated camera). To color a low resolution model, a computing device may identify an appropriate triangle or other geometric shape in an unwrapped mesh, and find an interpolated surface normal on a corresponding 3D version of the model (there may be a one to one mapping of triangles in the texture coordinates and 3D version of the model). After intersecting the high resolution mesh, a ray (and related vector) may be sent to the camera position.

There are a number of benefits that may arise from performing the processes described herein. For example, the process of decimating the mesh will often introduce distortion in the shape (and in particular the height of a point "P" relative to the true surface). If rays are sent directly from the low resolution model (e.g., FIG. 5C), an incorrect position may cause ghosting or other issues with focus. By using a high resolution model to check against one or more image capturing devices (e.g., FIG. 5B), distortion can be minimized.

Figure 6:
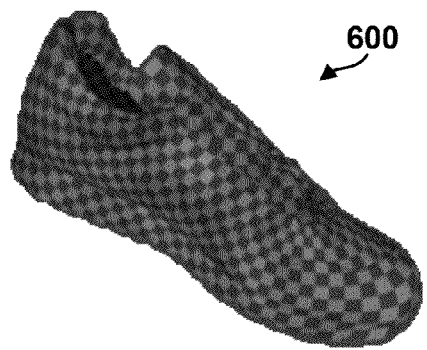
FIG. 6 illustrates an example 3D mesh.

FIG. 6 illustrates an example 3D mesh, in accordance with at least some of the embodiments described herein. In particular, FIG. 6 illustrates a 3D model mesh 600 created from multiple images of a 3D object that were scanned and aligned to create the 3D model mesh 600. The illustrated 3D model mesh 600 includes a number of quadrilaterals that define the parameters of the object.

Figure 7:
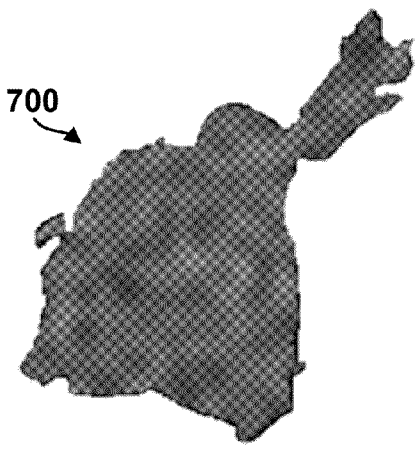
FIG. 7 illustrates an example 2D mesh.

FIG. 7 illustrates an example 2D mesh, in accordance with at least some of the embodiments described herein. In particular, FIG. 6 illustrates an unwrapped 2D mesh 700, which may be associated with the 3D model mesh 600. In embodiments, the 2D mesh 700 may represent a 2D image of the object, for example. Each location on the 3D model mesh 600 may correspond to a location on the 2D mesh 700. One or more textures (such as a shape and/or surface shading) associated with the 3D model mesh 600 may correspond to the 2D mesh 700. Further, each location on the image of the 3D object may correspond to a location on the 2D image of the object.

Figure 8:
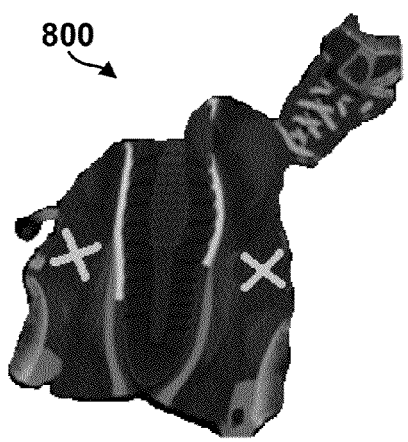
FIG. 8 illustrates an example 2D mesh after a color transfer.

FIG. 8 illustrates an example 2D mesh after a color transfer, in accordance with at least some of the embodiments described herein. In particular, FIG. 8 illustrates a textured 2D mesh 800. The textured mesh 800 may include one or more textures, such as a surface texture, a color, etc. In embodiments, one or more of the textures may be identified based on the 3D model mesh 600 and/or based on images of the 3D object that may have been used to create the 3D model mesh 600.

As an example, the textured 2D mesh 800 may include texture in the form of color. The color may be obtained, for example, by identifying a color at a location on the 3D object as described in more detail elsewhere herein. Once a color is identified, the identified color may be associated with the corresponding location on the 2D image of the object (e.g., the corresponding location on the 2D mesh) so as to create the textured 2D mesh 800, for example.

In embodiments, the textured 2D mesh 800 may be wrapped on a 3D mesh, such as 3D model mesh 600. This process may include transferring texture data associated with a location on the textured 2D mesh 800 to a corresponding location on the 3D model mesh 600, for example. Thus, textures (such as color) that may have been lost during the creation of the 3D model mesh 600 may be identified and applied to not only create the textured 2D mesh 800, but also the corresponding 3D model mesh 600.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method executed by a computing device, the method comprising:
   receiving, at the computing device, a plurality of images of an object;
   identifying (i) a first texture value for a point in a first image of the plurality of images of the object, and (ii) a second texture value for a respective point in a second image of the plurality of images of the object;
   identifying (i) a view reference point vector between the point in the first image and an image capturing device, and (ii) a respective view reference point vector between the respective point in the second image and the image capturing device;
   identifying a first normal vector of the point in the first image and a second normal vector of the respective point in the second image;
   determining a first metric based at least on: (i) a relation between the view reference point vector and the first normal vector, (ii) a distance between the point and the image capturing device, and (iii) a size of a surface area of the object as depicted in the first image;
   determining a second metric based at least on: (i) a respective relation between the respective view reference point vector and the second normal vector, (ii) a distance between the respective point and the image capturing device, and (iii) a size of a surface area of the object as depicted in the second image; and
   based on the first metric and the second metric, using the first texture value and the second texture value to determine a weighted average texture value to apply to a corresponding point of a three-dimensional (3D) mesh of the object.

2. The method of claim 1 wherein the first metric is represented as a confidence interval associated with the first texture value such that the larger the size of the surface area of the object as depicted in the first image, the higher the confidence interval.

3. The method of claim 1,
   wherein the weighted average texture value is a mean of a first weighted texture value and a second weighted texture value, and
   wherein the first weighted texture value is based on the first metric and the first texture value, and the second weighted texture value is based on the second metric and the second texture value.

4. The method of claim 1, wherein determining the first metric based partially on the relation between the view reference point vector and the normal vector comprises:
   determining a scalar product based on the view reference point vector and the normal vector; and
   applying a weight to the scalar product.

5. The method of claim 4, wherein the first metric is zero based on the scalar product being negative.

6. The method of claim 1, wherein the first texture value is a red, green, blue color code.

7. A system comprising:
   at least one processor;
   a non-transitory computer-readable medium; and
   program instructions stored on the non-transitory computer-readable medium and executable by the at least one processor to cause the system to:
   receive a plurality of images of an object;
   identify (i) a first texture value for a point in a first image of the plurality of images of the object, and (ii) a second texture value for a respective point in a second image of the plurality of images of the object;
   identify (i) a view reference point vector between the point in the first image and an image capturing device, and (ii) a respective view reference point vector between the respective point in the second image and the image capturing device;
   identify a first normal vector of the point in the first image and a second normal vector of the respective point in the second image;
   determine a first metric based at least on: (i) a relation between the view reference point vector and the first normal vector, (ii) a distance between the point and the image capturing device, and (iii) a size of a surface area of the object as depicted in the first image;

determine a second metric based at least on: (i) a respective relation between the respective view reference point vector and the second normal vector, (ii) a distance between the respective point and the image capturing device, and (iii) a size of a surface area of the object as depicted in the second image; and based on the first metric and the second metric, use the first texture value and the second texture value to determine a weighted average texture value to apply to a corresponding point of a three-dimensional (3D) mesh of the object.

8. The system of claim 7, wherein the weighted average texture value is a mean of a first weighted texture value and a second weighted texture value, and wherein the first weighted texture value is based on the first metric and the first texture value, and the second weighted texture value is based on the second metric and the second texture value.

9. The system of claim 7, further comprising program instructions stored on the non-transitory computer-readable medium and executable by the at least one processor to cause the system to:

determine a scalar product based on the view reference point vector and the normal vector; and apply a weight to the scalar product.

10. The system of claim 9, wherein the first metric is zero based on the scalar product being negative.

11. The system of claim 7, wherein the first texture value is a red, green, blue color code.

12. A non-transitory computer readable medium having stored thereon instructions, that when executed by a computing device having at least one processor, cause the computing device to perform functions comprising:

receiving a plurality of images of an object;

identifying (i) a first texture value for a point in a first image of the plurality of images of the object, and (ii) a second texture value for a respective point in a second image of the plurality of images of the object;

identifying (i) a view reference point vector between the point in the first image and an image capturing device, and (ii) a respective view reference point vector between the respective point in the second image and the image capturing device;

identifying a first normal vector of the point in the first image and a second normal vector of the respective point in the second image;

determining a first metric based at least on: (i) a relation between the view reference point vector and the first normal vector, (ii) a distance between the point and the image capturing device, and (iii) a size of a surface area of the object as depicted in the first image;

determining a second metric based at least on: (i) a respective relation between the respective view reference point vector and the second normal vector, (ii) a distance between the respective point and the image capturing device, and (iii) a size of a surface area of the object as depicted in the second image; and based on the first metric and the second metric, using the first texture value and the second texture value to determine a weighted average texture value to apply to a corresponding point of a three-dimensional (3D) mesh of the object.

13. The non-transitory computer readable medium of claim 12, wherein the first metric is represented as a confidence interval associated with the first texture value such that the larger the size of the surface area of the object as depicted in the first image, the higher the confidence interval.

14. The non-transitory computer readable medium of claim 12, wherein the weighted average texture value is a mean of a first weighted texture value and a second weighted texture value, and wherein the first weighted texture value is based on the first metric and the first texture value, and the second weighted texture value is based on the second metric and the second texture value.

15. The non-transitory computer readable medium of claim 12, wherein the instructions are further executable by the computing device to cause the computing device to perform functions comprising:

determining a scalar product based on the view reference point vector and the normal vector; and applying a weight to the scalar product.

16. The non-transitory computer readable medium of claim 15, wherein the first metric is zero based on the scalar product being negative.

17. The non-transitory computer readable medium of claim 12, wherein the first texture value is a red, green, blue color code.

* * * * *